(12) United States Patent
Morioka

(10) Patent No.: US 7,256,959 B2
(45) Date of Patent: Aug. 14, 2007

(54) MAGNETIC DISK DEVICE

(75) Inventor: Junichiro Morioka, Matsuyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 54 days.

(21) Appl. No.: 10/546,585

(22) PCT Filed: Mar. 1, 2004

(86) PCT No.: PCT/JP2004/002511
§ 371 (c)(1),
(2), (4) Date: Aug. 19, 2005

(87) PCT Pub. No.: WO2004/079741
PCT Pub. Date: Sep. 16, 2004

(65) Prior Publication Data
US 2006/0146440 A1  Jul. 6, 2006

(30) Foreign Application Priority Data
Mar. 6, 2003  (JP) .............................. 2003-059947

(51) Int. Cl.
*G11B 17/02* (2006.01)
(52) U.S. Cl. .................................................. 360/97.01
(58) Field of Classification Search .............. 360/97.01
See application file for complete search history.

(56) References Cited

U.S. PATENT DOCUMENTS

| 6,023,392 A * | 2/2000 | Kim ........................ 360/97.01 |
| 6,351,344 B1 * | 2/2002 | Krum et al. ............. 360/97.01 |
| 6,560,063 B1 * | 5/2003 | Keffeler et al. .......... 360/97.01 |

FOREIGN PATENT DOCUMENTS

| JP | 6-215339 | 8/1994 |
| JP | 2002-124076 | 4/2002 |
| JP | 2002-343071 | 11/2002 |

* cited by examiner

*Primary Examiner*—William Korzuoh
(74) *Attorney, Agent, or Firm*—Steptoe & Johnson LLP

(57) ABSTRACT

A magnetic disk device having a cover of a simple structure having high rigidity and not easily deformable by pressure from the outside. An envelop surface configuration (46) of at least a portion of a cover (40) positioned opposite a magnetic disk (2, 43) is made generally conical, such that the distance from the magnetic disk decreases along a direction from the vicinity of a rotating shaft of a motor, as the center, toward the outer periphery of the magnetic disk, thereby reducing the amount of deformation of the cover, particularly in the vicinity of the rotating shaft of the motor.

14 Claims, 11 Drawing Sheets

|  | CONVENTIONAL COVER | COVER IN EMBODIMENT 1 (STEPPED CONICAL SHAPE) |
|---|---|---|
| MAXIMUM WARP (mm) | 0.48 | 0.11 |
| MAXIMUM STRESS N/m² | $5 \times 10^7$ | $2.7 \times 10^7$ |

|  | CONVENTIONAL COVER | COVER IN EMBODIMENT 2 (CONICAL SHAPE) |
|---|---|---|
| MAXIMUM WARP (mm) | 0.48 | 0.14 |
| MAXIMUM STRESS N/m² | 5×10⁷ | 3.0×10⁷ |

MAGNETIC DISK DEVICE

TECHNICAL FIELD

The present invention relates to a small magnetic disk device used in a computer or the like.

BACKGROUND ART

A problem has recently arisen that, in magnetic disk devices mounted in mobile appliances such as notebook computers, it is necessary to make a cover sufficiently rigid in the direction toward the magnetic disk surface. For example, in notebook computers and magnetic disk devices incorporated in the notebook computers, the magnetic disk device is ordinarily mounted under a palmrest portion closer to the computer front side relative to the keyboard. In such a case, if the palmrest portion is strongly pressed by a person, the pressed portion is warped and presses the cover of the magnetic disk device mounted under the palmrest portion incorporated mounted. The cover of the magnetic disk device is ordinarily made a thin metal plate. At worst, a portion of the warped cover is brought into contact with the magnetic disk rotating in the magnetic disk device. There is a demand for thinner mobile appliances and thinner magnetic disk devices incorporated in the mobile appliances. Therefore, it is thought that this problem will become more serious.

In view of this problem, devices for improving the rigidity of covers have been provided. For example, a method is known in which a reinforcing member of a high rigidity is placed in a space between a magnetic disk and a cover and is connected to the cover and to a base by using fastening screws (see, for example, Japanese Patent Laid-Open No. 2002-343071).

The shape of a conventional cover will be described with reference to FIGS. 6 to 8. FIG. 6 shows a magnetic disk device using a conventional cover. FIG. 7 is a sectional view of the conventional cover. FIG. 8 is a sectional view taken along a line passing through the rotating shaft of a motor. As can be seen in FIG. 7, drawn portions 70 having a semicircular sectional shape are formed in a sectoral pattern above and opposite a magnetic disk to ensure the desired rigidity of the cover.

DISCLOSURE OF THE INVENTION

The conventional technique of placing a reinforcing member has drawbacks in that the cost is increased because of the need for the component part in addition to the cover and it is not suitable for a thin device because it increases the thickness of the device.

To solve the above-described problem, the present invention provides a magnetic disk device including a magnetic disk, a motor for rotating the magnetic disk through its rotating shaft, a head for writing data to the magnetic disk or reading out data from the magnetic disk, an arm on which the head is supported, an actuator connected to the arm to move the head generally in a radial direction across the magnetic disk, a base on which the magnetic disk, the motor and the actuator are supported and accommodated, and a cover for enclosing the entire device in association with the base, wherein the cover is placed opposite to the magnetic disk and is formed so that the gap between the inner surface of the cover and the magnetic disk is reduced along a direction from the rotating shaft portion of the motor toward the outer periphery of the magnetic disk.

According to the present invention, a magnetic disk device having a cover that has a simple structure and is not easily deformed under a pressure from the outside can be provided.

According to the cover shape in accordance with the present invention, the static rigidity of the cover is improved to enable a pressure from the outside to be dispersed to the periphery, thereby reducing the stress and preventing deformation due to the stress. The cover shape can be adapted for reduction in the thickness of a magnetic disk device.

BEST MODE FOR CARRYING OUT THE INVENTION

Magnetic disk devices which represent embodiments of the present invention will be described in detail with reference to the drawings.

EMBODIMENT 1

Figure 1:
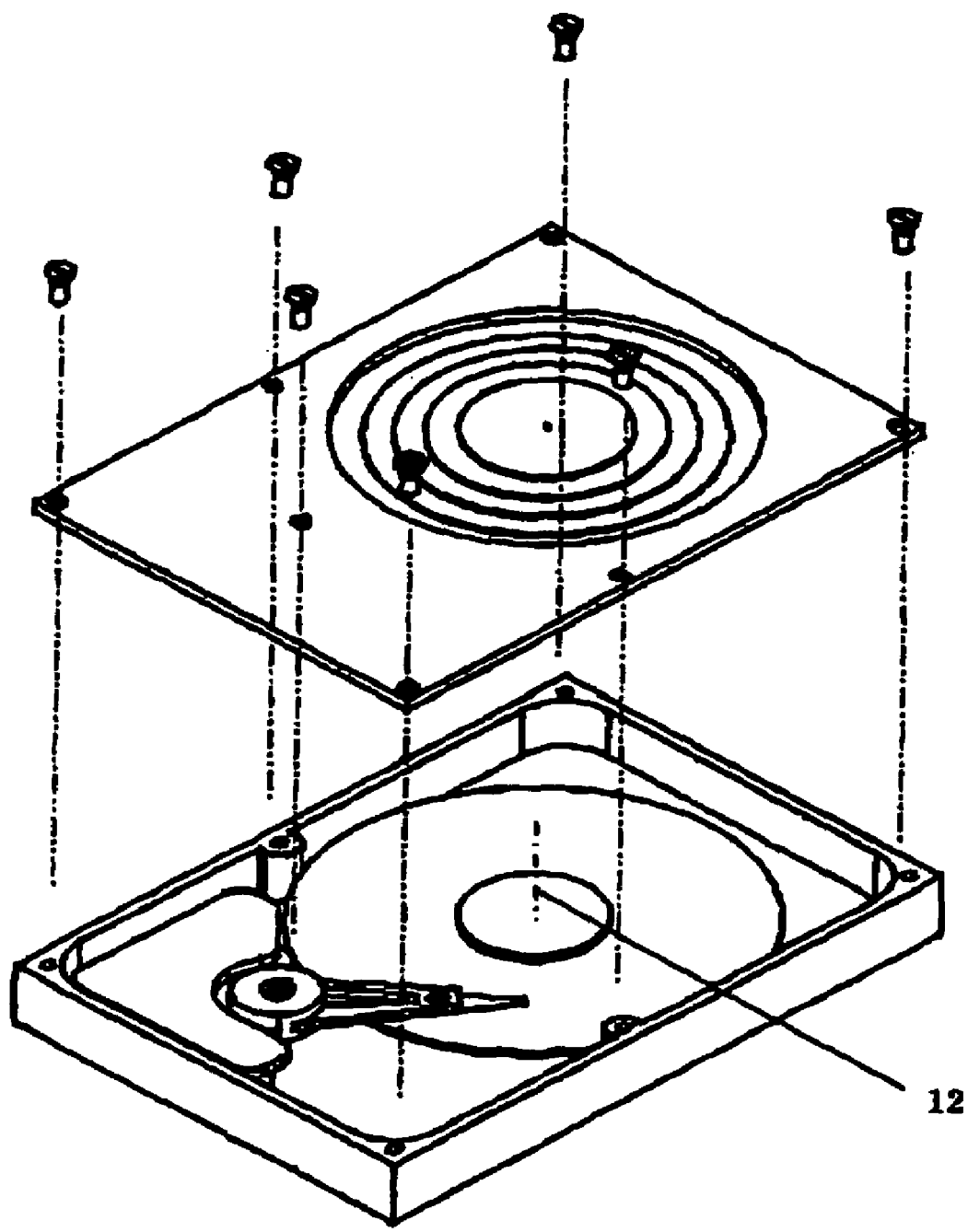
FIG. 1 is a perspective view of a magnetic disk device in the present invention.
Figure 2:
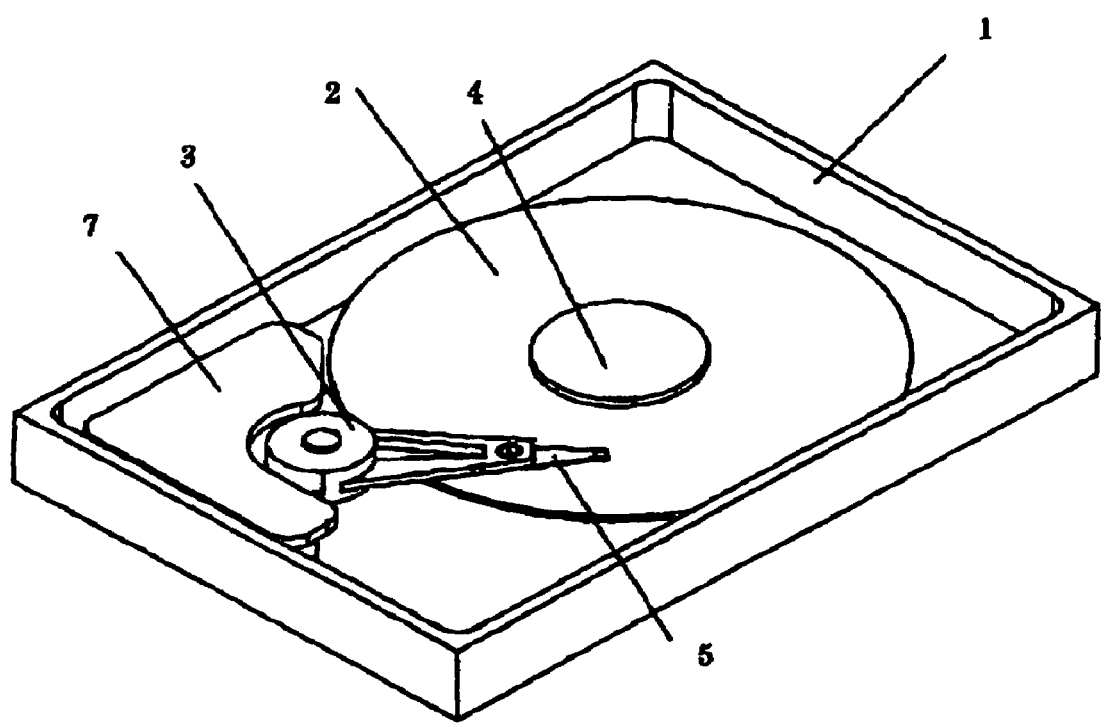
FIG. 2 is a perspective view of the magnetic disk device in the present invention.
Figure 3:
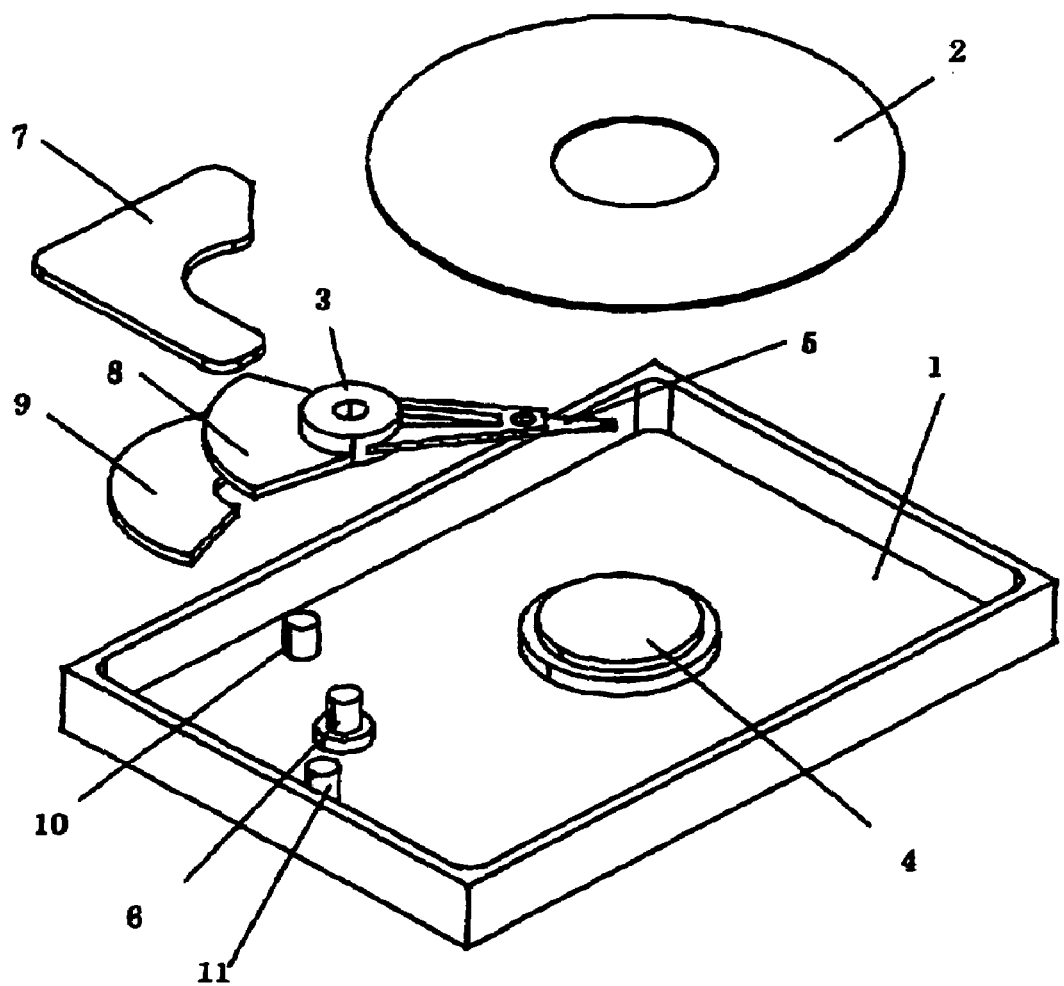
FIG. 3 is an exploded view of the magnetic disk device in the present invention.

FIGS. 1 and 2 are perspective views of a magnetic disk device which represents a first embodiment of the present invention. FIG. 3 is an exploded view of the magnetic disk device. FIG. 1 shows a state in which a cover is opened. When the magnetic disk device is in operation, the cover is fixed to a base with seven screws. FIG. 2 shows a state in which the cover is removed. The magnetic disk device has the base 1, a magnetic disk 2 and an actuator 3. The magnetic disk 2 is driven and rotated by a spindle motor 4. On one end of the actuator 3, a suspension 5 is mounted and a head element is attached to an end portion of the suspension 5. A magnet is fixed to a back surface of an upper yoke 7 and fixed on that base 1 with a predetermined spacing from a lower yoke 9 maintained. A magnetic circuit is thereby formed. During operation, the actuator 3 is turned on a pivot shaft 6 by electromagnetic interaction between the magnetic circuit and an actuator coil 8 to position the head element at a desired position on the magnetic disk 2. Reference numerals 10 and 11 denote crush stops which are provided in correspondence with the limits of the range of rotation of the actuator 3 to limit the range of rotation of the actuator 3, and which acts to reduce an impact force at the time of collision. The crush stops 10 and 11 are formed of elastic cylindrical members fixed on the base 1.

Figure 4:
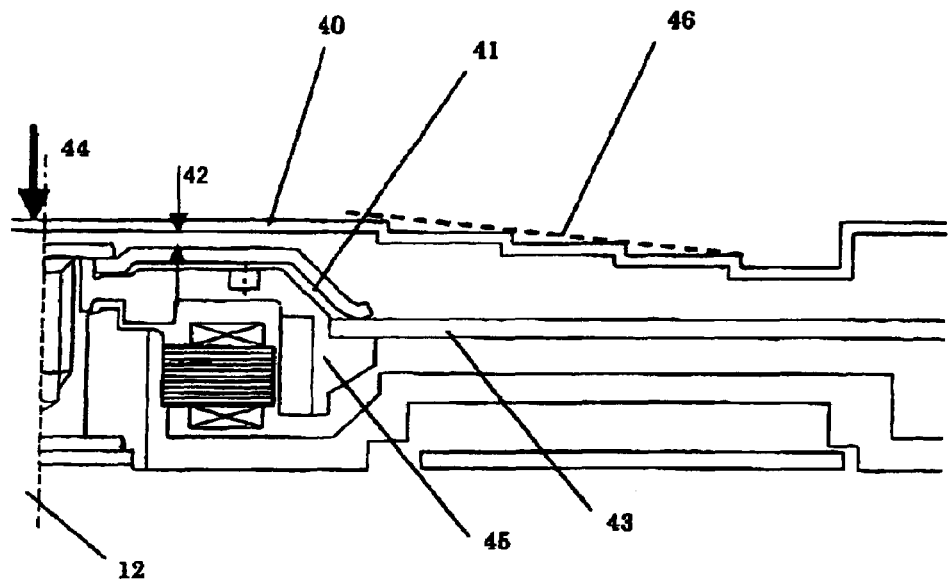
FIG. 4 is a sectional view of the magnetic disk device in the present invention.
Figure 5:
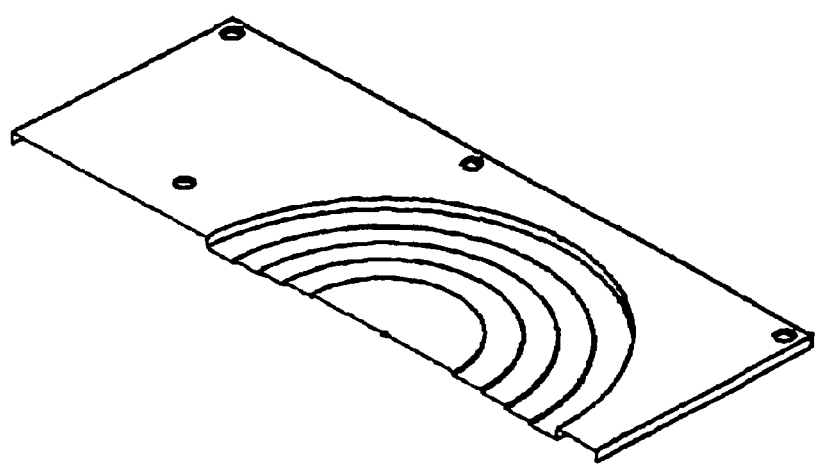
FIG. 5 is a perspective view of a cover in the present invention.

FIG. 4 is a sectional view along a line passing through a rotating shaft 12 of the motor. Reference numerals 40 denote the cover, reference numerals 43 the magnetic disk, and reference numerals 41 a clamp for fixing the magnetic disk 43 on a motor hub 45. An envelope surface 46 on the external shape of the cover 40 is conical. When a force 44 to press the cover 40 is applied from the outside, the cover 40 is warped and a gap 42 is reduced. As this gap 42, only a gap of about 0.5 mm is ordinarily provided. Therefore, it is important to ensure certain rigidity of the cover. FIG. 5 is a perspective view showing a section of the cover.

Figure 6:
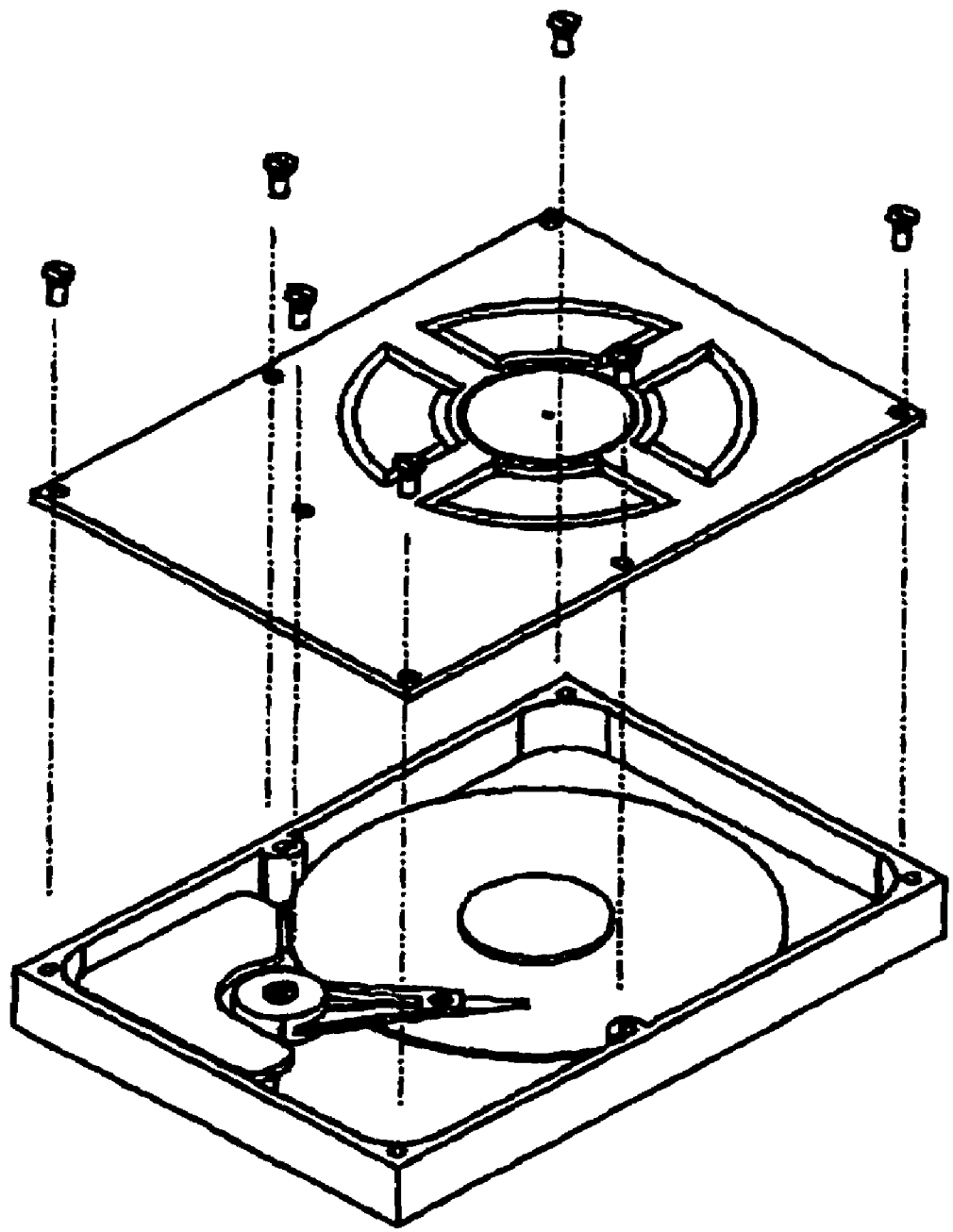
FIG. 6 is a perspective view of a magnetic disk device in an example of the conventional art.
Figure 7:
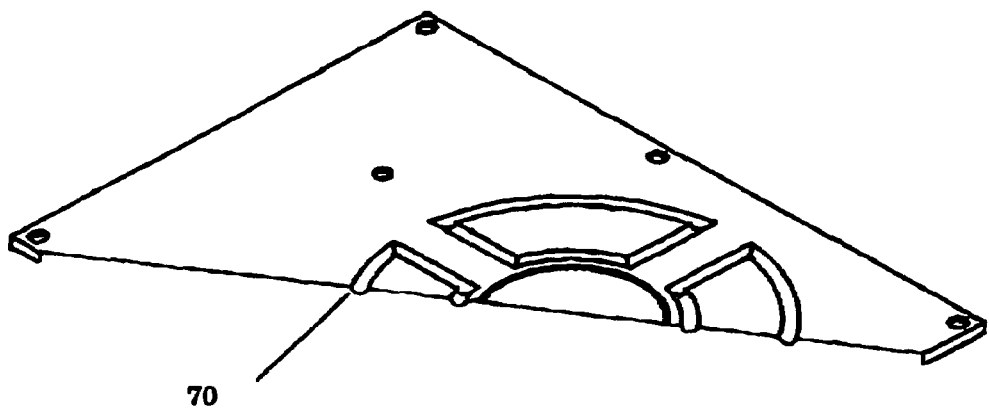
FIG. 7 is a perspective view of a cover in the example of the conventional art.
Figure 8:
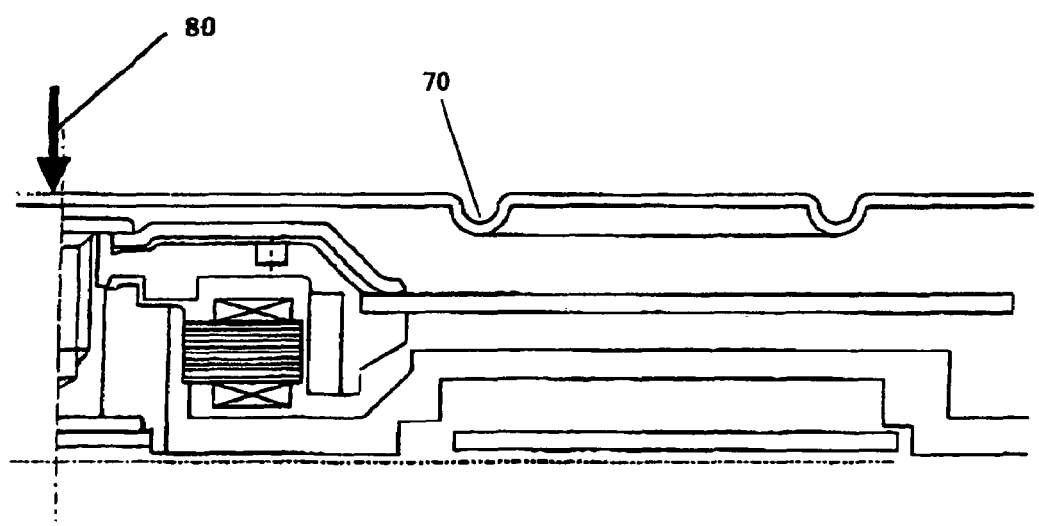
FIG. 8 is a sectional view of the magnetic disk device in the example of the conventional art.

A computer simulation based on a finite-element method was performed to compare the rigidity of the cover in accordance with the present invention and the above-described conventional cover shown in FIGS. 6 to 8.

Figure 9:
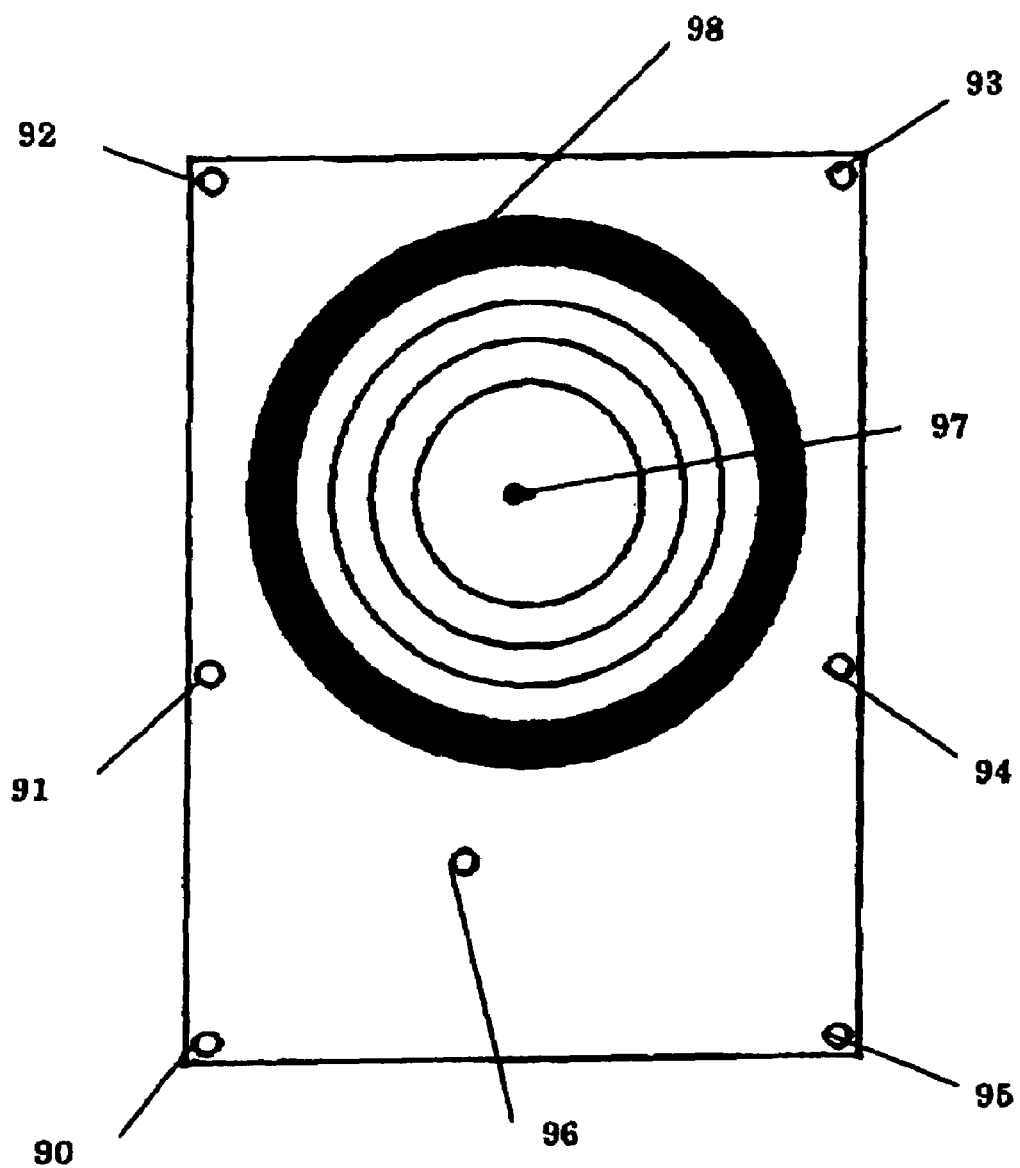
FIG. 9 is a plan view showing stress concentration in a cover in Embodiment 1 of the present invention.

The shape of the cover in the embodiment is a stepped conical shape, as shown in the sectional view of FIG. 4, the perspective view of FIG. 5 and a plan view of FIG. 9. That is, referring to FIG. 9 showing a plan view of the cover, concentric circles are formed around and concentrically with a circle formed on the cover above a rotating central portion from the rotating shaft 12 to the clamp 41. The differences in height at the steps formed in the cover as between the concentric circles are equal to each other. As indicated at 46 in FIG. 4, the envelope surface on the external shape of the cover 40 is conical. This cover shape, in which the shape of the portion above the rotating shaft 12 portion is flat and circular, is referred to as a stepped conical shape.

Figures 10, 11:
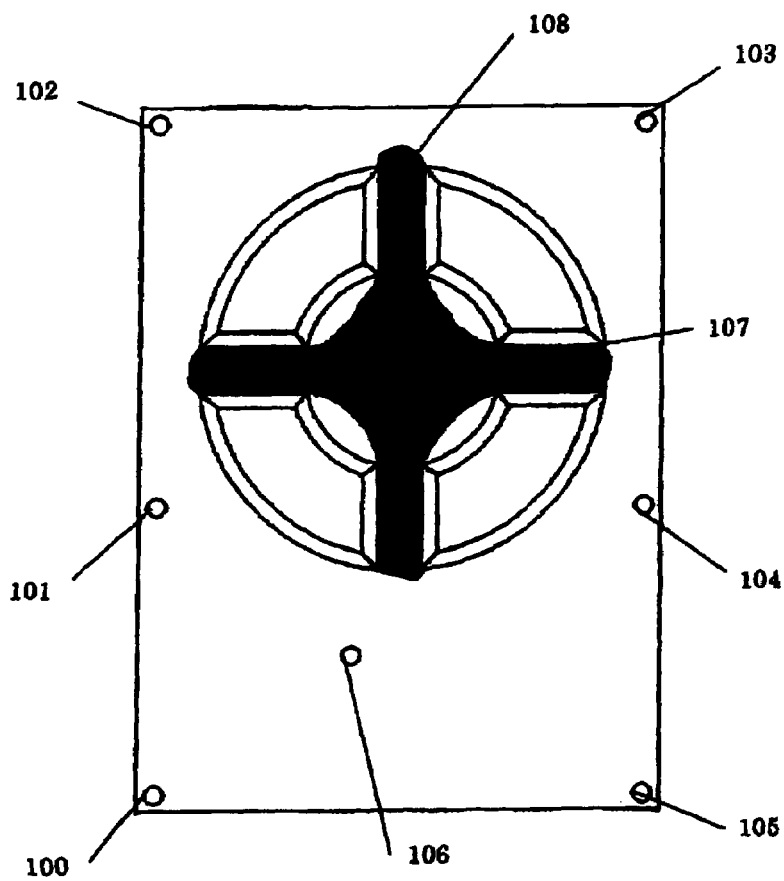
FIG. 10 is a plan view showing stress concentration in the cover in the example of the conventional art.
FIG. 11 is a diagram showing the results of a simulation in the present invention and the example of the conventional art.

FIG. 9 is a plan view of the cover in accordance with the present invention. FIG. 10 is a plan view of the conventional cover. Models of these covers were made by using a piece of finite element method analysis software and were divided into meshes for a shell element model one side of which is about 2.0 mm. Holes for fastening with screws (90, 91, 92, 93, 94, 95, and 96 in FIG. 9, 100, 101, 102, 103, 104, 105, and 106 in FIG. 10) were fixed under a perfect restraint condition and a pressure of 10N was applied in the cover pressing direction to the cover at the position corresponding to the rotating shaft of the motor. In actuality, a distributed load was applied to an area having a diameter of 23 mm about the rotating shaft of the motor such that the total pressure was 10N (see 44 in FIG. 4 and 80 in FIG. 8). The cover is made of aluminum and has a thickness of 0.4 mm. The amount of warp under these conditions was computed. FIG. 11 shows the results of computation. In each cover, the maximum warp was caused above the rotating shaft of the magnetic disk (97 in FIG. 9, 107 in FIG. 10). However, it can be understood that the static rigidity of the cover in accordance with the present invention is four times or more larger than that of the conventional cover. The main stress in the cover was examined to find that the stress was distributed in a peripheral annular portion (blackened portion 98 in FIG. 9) in the cover of the present invention, while the stress was concentrated on a crossing portion (blackened portion 108 in FIG. 10) in the conventional cover.

That is, it was found that the stress was concentrated on a low-rigidity portion. In the conventional cover, the rigidity of the crossing portion is low and the stress is concentrated on this portion. In the cover of the present invention, steps are formed by heightening the central portion relative to the peripheral portion, so that the rigidity of the central portion is higher than that of the peripheral portion. Since the steps are provided, the rigidity is reduced along a direction toward the peripheral portion to disperse the stress. Therefore, the amount of deformation of the cover is reduced.

That is, since stress is concentrated on a portion of a low rigidity, the stress is concentrated in the narrow crossing portion at the center of the conventional cover to largely deform the cover. In the cover of the present invention, the rigidity is gradually reduced from the central portion to the peripheral portion, that is, the stress is dispersed to the peripheral portion, so that the maximum stress is reduced and the amount of deformation of the cover is also reduced.

In the results of the simulation, while the maximum stress value of the conventional cover was $3.7 \times 10^7$ (N/m$^2$) to $5 \times 10^7$ (N/m$^2$), the maximum stress value of the cover of the present invention was $2.5 \times 10^7$ (N/m$^2$) to $2.7 \times 10^7$ (N/m$^2$). That is, it was found that in the cover of the present invention the applied pressure was adequately dispersed to limit the maximum stress to reduce the amount of warp.

That is, the steps are formed to enable the stress to be dispersed to the stepped peripheral portion, thereby ensuring the desired rigidity. While an arrangement having four steps has been described as an embodiment of the present invention, it is possible to increase the number of steps to disperse stress to the periphery. Since it is possible to enable stress to be dispersed to the peripheral side by providing steps, the rigidity of the cover can be improved even if the number of steps is not four. If three or more steps are provided, a certain effect of dispersing pressure and reducing the maximum stress can be obtained. However, it is preferable to provided four or more steps.

In the plan view of the cover shown in FIG. 9, the cover is circular and formed around and concentrically with the circular portion formed above the rotating shaft central portion from the rotating shaft 12 to the clamp 41, and the differences in height at the steps formed between the concentric circles are equal to each other, so that the envelop surface 46 on the external shape of the cover 40 is conical. However, the same effect can be obtained even if the envelope surface 46 is not conical. That is, the same effect can be obtained even if the distances between the concentric circles are not constant and the envelope surface 46 is not conical.

Thus, a cover structure can be realized which is simple and easy to manufacture, and in which the amount of warp of the cover in an out-of-plane direction, i.e., the direction toward the magnetic disk surface, is small since the rigidity is high and since a pressure from the outside is absorbed in the stepped portions.

That is, since a stress caused in the cover can be dispersed to reduce the warp of the cover, the worst event can be avoided in which, in a case where thickness of the magnetic disk device is reduced, a portion of the cover of the magnetic disk device cover is brought into contact with a portion of the magnetic disk rotating in the magnetic disk device when the cover is warped.

Also, because the material of the cover is a metal such as aluminum, stainless steel or an alloy of such metals for high rigidity against pressure in the direction perpendicular to the cover surface, a cover structure in which the amount of warp in the direction toward the magnetic disk surface can be realized by using a method such as pressing easy to carry out.

EMBODIMENT 2

Figure 12:
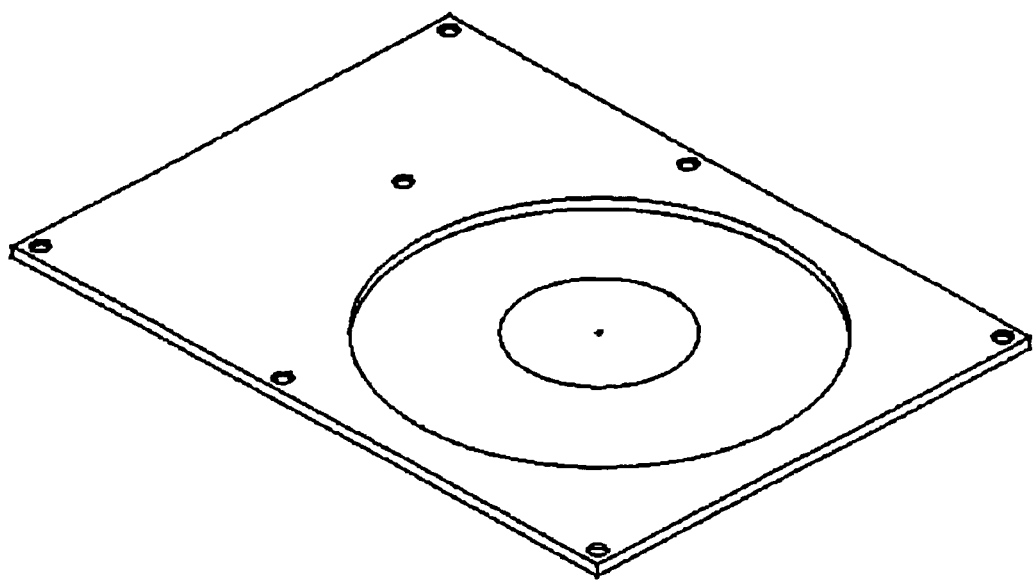
FIG. 12 is a perspective view of a cover in Embodiment 2 of the present invention.
Figure 13:
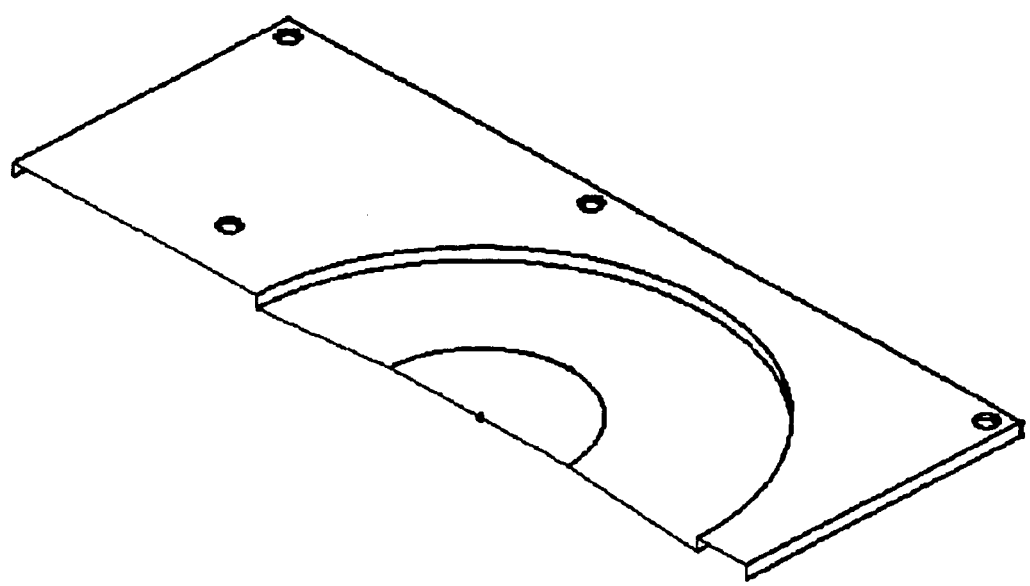
FIG. 13 is a perspective view showing a section of the cover in Embodiment 2 of the present invention.
Figures 14, 15:
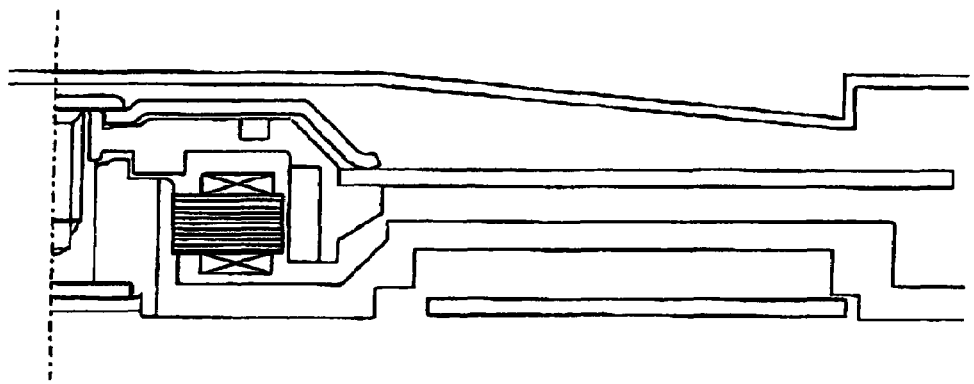
FIG. 14 is a sectional view of a magnetic disk device in Embodiment 2 of the present invention.
FIG. 15 is a diagram showing the results of a simulation in the present invention and the example of the conventional art.

The shape of a cover in another embodiment will be described with reference to FIGS. 12 to 14. FIG. 12 is a perspective view of the cover. FIG. 13 is a perspective view showing a section of the cover. FIG. 14 is a sectional view taken along a line passing through the rotating shaft of the motor. In Embodiment 1, only a portion of the envelope surface of the surface shape of the cover forms a conical shape, as indicated at 46 in FIG. 4. In Embodiment 2, the surface shape of the cover directly forms a conical shape. In actuality, the cover shape above the rotating shaft 12 is a circular flat shape and the cover has the shape of a truncated cone. However, the shape of the cover in Embodiment 2 is referred to as a conical shape in relation to Embodiment 1.

FIG. 15 shows the values of the characteristics of the cover in Embodiment 2 computed by the finite-element method. The conditions for computation are the same as those in Embodiment 1 shown in FIG. 11. As shown in FIG. 15, substantially the same characteristics as those shown in FIG. 11 were obtained. A case is conceivable in which a material used for the cover, the method of manufacturing the cover, or restrictions on the sizes of component parts housed are such that directly forming the cover surface shape into a conical shape is more convenient than forming the envelope surface on the cover surface shape into a conical shape. In such a case, Embodiment 2 is effective.

In Embodiment 2, the maximum warp in the same simulation based on the finite-element method as that in Embodiment 1 was 0.14 mm above the magnetic disk rotating shaft and the maximum stress in the peripheral portion was $3.0 \times 10^7$ (N/m$^2$), which results are similar to those in Embodiment 1. That is, the effect of improving the rigidity of the cover was obtained in the case of forming into a conical shape.

That is, the stress was dispersed to the peripheral portion by making the cover shape conical, as in the case of Embodiment 1. Thus, the rigidity of the cover can be increased.

It is also possible to increase the rigidity of the cover by making the cover surface shape domed.

EMBODIMENT 3

Figure 16:
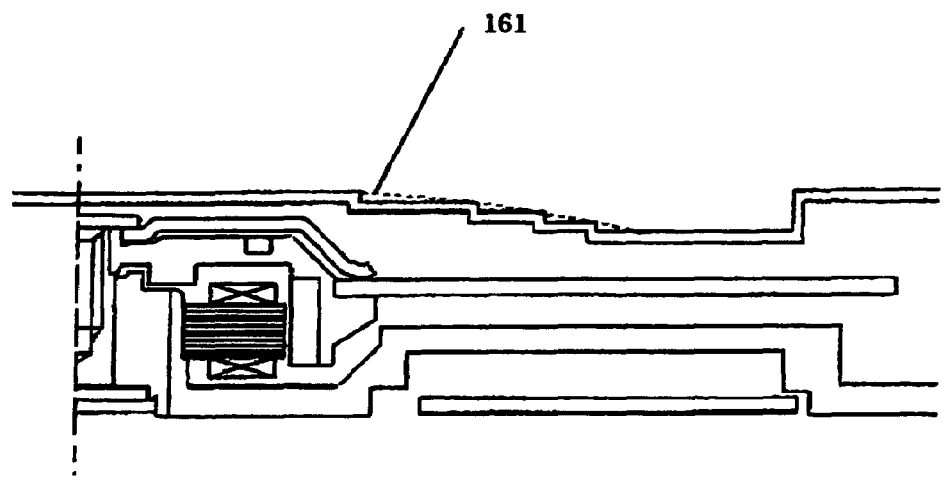
FIG. 16 is another sectional view of a magnetic disk device in Embodiment 3 of the present invention.

FIG. 16 shows a case where the cover is formed into a stepped shape such that the envelope surface on the cover surface is formed into a domed shape (hereinafter referred to as "stepped dome") different from a conical shape. FIG. 16 is a sectional view taken along a line passing through the rotating shaft of the motor. As indicated at 161 in FIG. 16, the stepped-dome shape is such that differences in height are provided in a stepping manner in the cover of the magnetic disk device and the envelope surface on the cover surface shape has a domed shape.

The difference from Embodiment 1 resides in that the envelope surface 161 on the cover surface shape for ensuring the desired rigidity has a stepped-dome shape different from a conical shape. Also in this case, a pressure applied to the cover is adequately dispersed to limit the maximum stress and reduce the amount of warp. A case is conceivable in which a material used for the cover, the method of manufacturing the cover, or restrictions on the sizes of component parts housed are such that forming the envelope surface of the cover surface shape into a stepped-dome shape is more convenient than forming the envelope surface on the cover surface shape into a conical shape.

Figure 17:
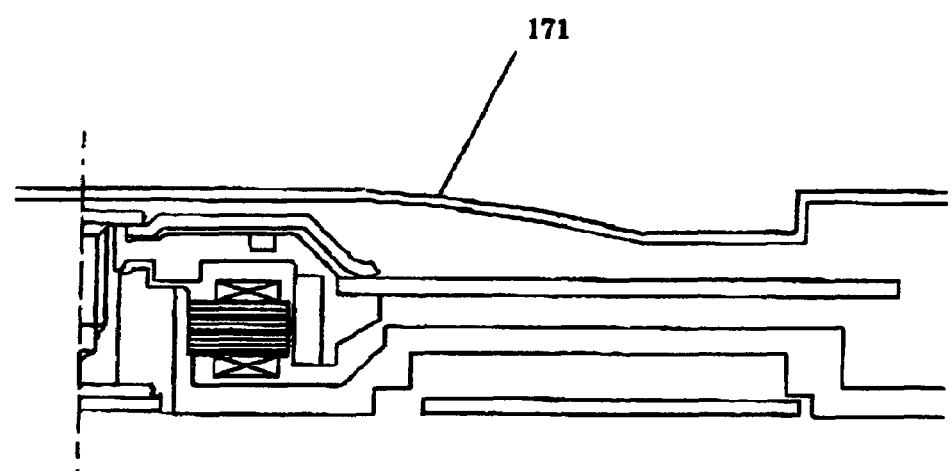
FIG. 17 is another sectional view of a magnetic disk device in Embodiment 2 of the present invention.

Further, the stepped-dome cover surface shape may be replaced with a smoothly domed shape to ensure the desired rigidity. FIG. 17 shows a case where the cover surface face shape is a domed shape. FIG. 17 is a sectional view taken along a line passing through the rotating shaft of the motor. As indicated at 171 in FIG. 17, the surface shape of the cover of the magnetic disk device is formed into a domed shape to enable an applied pressure to be adequately dispersed, thereby limiting the maximum stress and reducing the amount of warp. A case is conceivable in which a material used for the cover, the method of manufacturing the cover, or restrictions on the sizes of component parts housed are such that directly forming the cover surface shape into a domed shape is more convenient than forming the envelope surface on the cover surface into a domed shape.

Thus, a cover shape structure enabling stress to be dispersed to the periphery is adopted to reduce the amount of deformation of the cover.

Also, because the material of the cover is a metal such as aluminum, stainless steel or an alloy of such metals for high rigidity against pressure in the direction perpendicular to the cover surface, a cover structure in which the amount of warp in the direction toward the magnetic disk surface can be realized by using a method such as pressing easy to carry out.

The invention claimed is:

1. A magnetic disk device comprising
   a magnetic disk,
   a motor (4) for rotating the magnetic disk through its rotating shaft (12),
   a head for writing data to the magnetic disk or reading out data from the magnetic disk,
   an arm on which the head is supported,
   an actuator (3) connected to the arm to move the head generally in a radial direction across the magnetic disk,
   a base (1) on which the magnetic disk, the motor (4) and the actuator (3) are supported and accommodated, and
   a cover (40) for enclosing the entire device in association with the base (1), said cover comprising a dome comprising concentric steps, the center of the dome being concentric with rotating shaft (12),
   wherein the cover (40) is placed opposite to the magnetic disk and is formed so that the gap between the inner surface of the cover (40) and the magnetic disk is reduced along a direction from the rotating shaft portion of the motor (4) toward the outer periphery of the magnetic disk.

2. The magnetic disk device according to claim 1, wherein the material of the cover (40) is a metal such as aluminum, stainless steel or an alloy of such metals for high rigidity against pressure in a direction perpendicular to the cover (40).

3. The magnetic disk device according to claim 1, wherein the shape of the cover (40) above the rotating shaft portion (12) of the motor (4) is a circular flat shape.

4. A magnetic disk device comprising a magnetic disk, a motor (4) for rotating the magnetic disk through its rotating shaft (12), a head for writing data to the magnetic disk or reading out data from the magnetic disk, an arm on which the head is supported, an actuator (3) connected to the arm to move the head generally in a radial direction across the magnetic disk, a base (1) on which the magnetic disk, the motor (4) and the actuator (3) are supported and accommodated, and a cover (40) for enclosing the entire device in association with the base (1), wherein the cover (40) is opposite the magnetic disk and has a circular stepped dome shape, having a plurality of steps, the center of the dome being concentric with rotating shaft (12), such that the gap between the inner surface of the cover (40) and the magnetic disk decreases in width along a direction from the rotating shaft portion of the motor (4) toward the outer periphery of the magnetic disk.

5. The magnetic disk device according to claim 4, wherein the circular dome shape portion of the cover (40) is formed in a portion facing the magnetic disk.

6. The magnetic disk device according to claim 4, wherein the circular dome shape portion is in a portion of the cover (40) facing the magnetic disk (2).

7. The magnetic disk device according to claim 4, wherein the circular dome shape is a stepped-dome shape, such that the gap between the inner surface of the cover and the magnetic disk decreases in width step-by-step along a direction from the rotating shaft portion of the motor toward the outer periphery of the magnetic disk.

8. The magnetic disk device according to claim 7, wherein the circular stepped-dome shape comprises at least three steps reduced in height from the rotating shaft portion to the outer periphery.

9. The magnetic disk device according to claim 4, wherein the cover above the rotating shaft portion of the motor is a circular flat shape.

10. A magnetic disk device comprising a magnetic disk, a motor (4) for rotating the magnetic disk through its rotating shaft (12), a head for writing data to the magnetic disk or reading out data from the magnetic disk, an arm on which the head is supported, an actuator (3) connected to the arm to move the head generally in a radial direction across the magnetic disk, a base (1) on which the magnetic disk, the motor (4) and the actuator (3) are supported and accommodated, and a cover (40) for enclosing the entire device in association with the base (1), wherein the cover (40) is opposite the magnetic disk and has a conical shape having a plurality of steps, the center of the conical shape being concentric with rotating shaft (12), such that the gap between the inner surface of the cover (40) and the magnetic disk decreases in width along a direction from the rotating shaft portion of the motor (4) toward the outer periphery of the magnetic disk.

11. The magnetic disk device according to claim 10, wherein the conical shape portion is formed in a portion of the cover (40) facing the magnetic disk.

12. The magnetic disk device according to claim 10, wherein the conical shape is a stepped-conical shape, such that the gap between the inner surface of the cover and the magnetic disk decreases in width step-by-step along a direction from the rotating shaft portion of the motor toward the outer periphery of the magnetic disk.

13. The magnetic disk device according to claim 12, wherein the stepped-conical shape comprises at least three steps reduced in height from the rotating shaft portion to the outer periphery.

14. The magnetic disk device according to claim 10, wherein the cover above the rotating shaft portion of the motor is a circular flat shape.

\* \* \* \* \*